Oct. 5, 1965    H. O. METZGER    3,209,889
APPARATUS FOR ARRANGING PARQUET PANEL
Filed Feb. 15, 1963    4 Sheets-Sheet 1
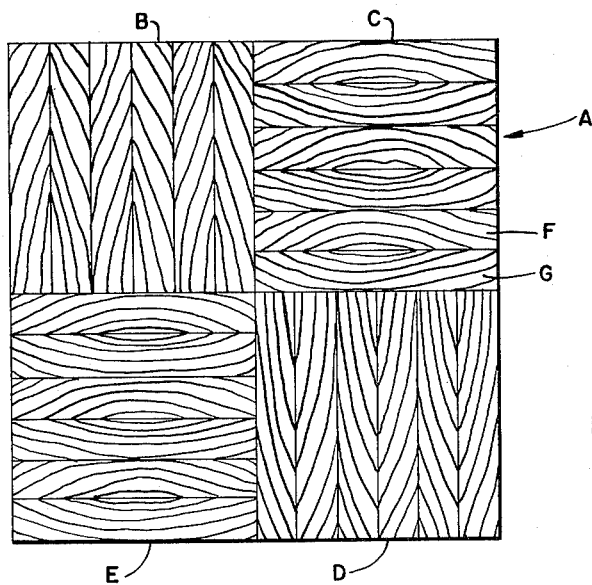
FIG.I.
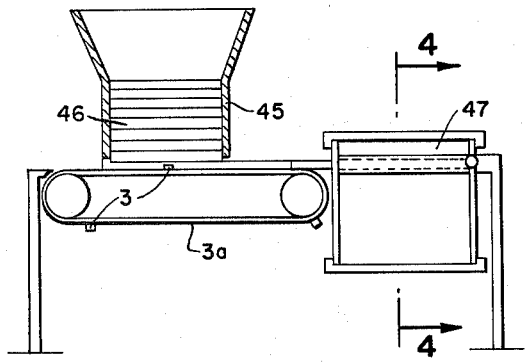
FIG.2.
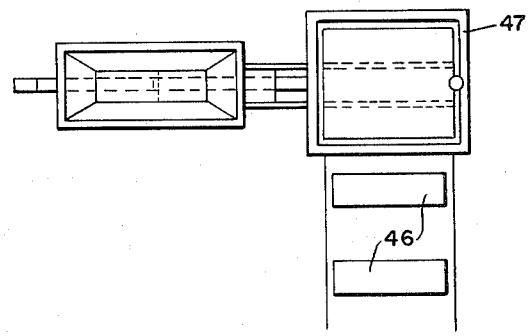
FIG.3.
INVENTOR
Hans Otto Metzger
BY Spencer & Kaye
ATTORNEYS Oct. 5, 1965   H. O. METZGER   3,209,889
APPARATUS FOR ARRANGING PARQUET PANEL
Filed Feb. 15, 1963   4 Sheets-Sheet 2

INVENTOR
Hans Otto Metzger
BY Spencer & Kaye
ATTORNEYS

Oct. 5, 1965     H. O. METZGER     3,209,889
APPARATUS FOR ARRANGING PARQUET PANEL
Filed Feb. 15, 1963     4 Sheets-Sheet 3

*INVENTOR*
Hans Otto Metzger

BY *Spencer & Kaye*
ATTORNEYS

United States Patent Office 3,209,889
Patented Oct. 5, 1965

3,209,889
APPARATUS FOR ARRANGING PARQUET PANEL
Hans Otto Metzger, Hofen (Enz), Wurttemberg, Germany
Filed Feb. 15, 1963, Ser. No. 258,876
Claims priority, application Germany, Feb. 16, 1962,
M 51,827
11 Claims. (Cl. 198—33)

The present invention relates generally to the wood working art, and, more particularly, to a small parquet panel constructed of wooden strips as well as to apparatus for manufacturing such small parquet panels.

Purchasers and others who are interested in parquet floors are, to an increasing extent, setting higher standards as far as the aesthetic quality of such floors is concerned. Efforts to satisfy such requirements have up to now been limited to a certain choice and corresponding grouping of strips which fit together with regard to color and/or tint, and these strips are taken from a pile of strips which is provided during the manufacturing operation. A rather large amount of expense is necessary when producing a panel in this manner if a time consuming and costly selection of strips with respect to the aesthetic viewpoint is to be carried out.

Accordingly, it is a main object of this invention to provide apparatus for making a small parquet panel which is of a high quality from an aesthetic viewpoint and which nevertheless does not require much time.

Another object of the present invention is to provide apparatus for making a parquet panel which is aesthetically appealing and which is simple to produce.

A further object of the present invention is to provide apparatus for producing a parquet panel which is entirely mechanical and automatic and yet produces aesthetically appealing panels in an inexpensive manner.

These objects and others ancillary thereto are accomplished according to preferred embodiments of the invention wherein a panel is provided in which the strips are arranged in pairs and, insofar as their grain is concerned, they are in exact mirror image symmetry within the strip units of the parquet panels.

Such panels may be economically mass-produced because the grouping of the strips is provided by feeding the strips in positions which correspond with their original positions in the raw wood, and then there is a general mechanical grouping of the strips.

This is provided by using a feed means for feeding the strips in a single row and with their broad surfaces touching one another so that they correspond to the original positions which they had in the raw wood slab. Then, a turning station is provided which is synchronized with the feeding of the strips and it is arranged at the end of the feeding means and includes a turning element for imparting motion impulses to the strips which impulses are directed at right angles to the longitudinal axes of the strips. This turning element provides neighboring strips with a turning motion which is of different direction or strength, with the aid of guiding elements and supported by gravity. Then, a conveying means is provided for further transporting the strips which have thus been grouped together in mirror image symmetry.

Additional objects and advantages of the present invention will become apparent upon consideration of the following description when taken in conjunction with the accompanying drawings in which:

FIGURE 1 is an elevational view of a small parquet panel comprising the present invention.

FIGURES 2 and 3 are side and plan views, respectively, of one embodiment for the turning device of the present invention.

FIGURES 7 and 7a are front and side views, respectively, of a further embodiment of a turning device of the present invention, and wherein FIGURE 7a is a schematic cross-sectional view taken substantially along the plane defined by reference line 7a—7a of FIGURE 7.

FIGURE 7b is a side view of a form of the invention similar to the one illustrated in FIGURES 7 and 7a.

Figure 4:
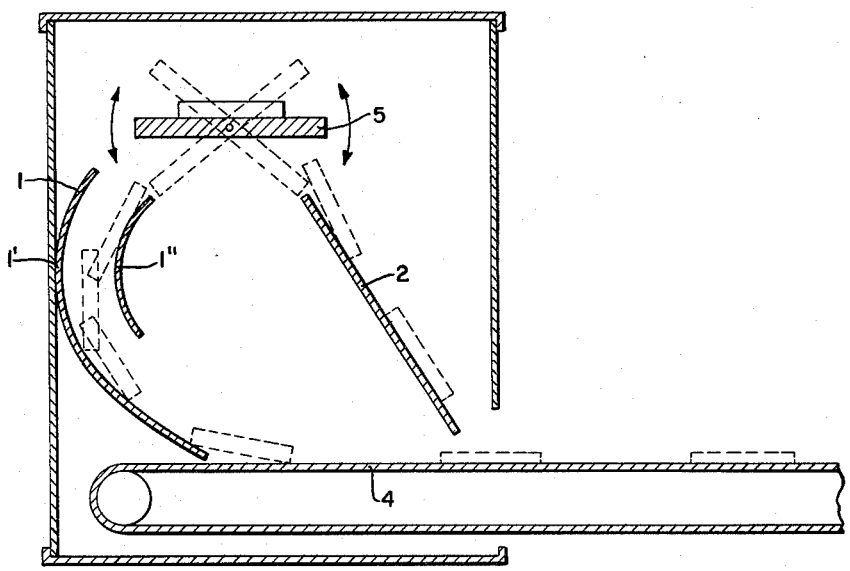
FIGURE 4 is a schematic vertical sectional view taken substantially along the reference line 4—4 of FIGURE 2 and illustrating in enlarged fashion the details of the turning device.
Figure 5:
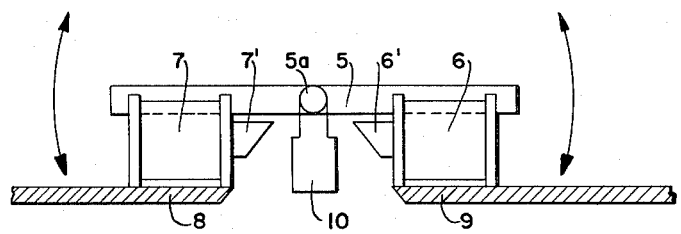
FIGURE 5 is a detail view illustrating one of the elements shown in FIGURE 4.

With more particular reference to the drawings, FIGURE 1 illustrates a parquet panel A produced in accordance with the present invention. This panel is formed of four sub-panels B, C, D, and E with the strips of sub-panels B and D extending in the same direction and the strips of sub-panels C and E extending in a direction at right angles thereto. Each of these sub-panels is formed from pairs of strips F and G which have their grain in mirror image symmetry so as to produce a panel which is aesthetically pleasing.

One embodiment of the invention is illustrated in FIGURES 2 through 6. The wooden strips 46 which are used in forming the parquet panels are disposed in magazine 45 with their broad surfaces lying against each other and their positions in the magazine corresponding to their original position after having been separated from the raw slab. Feeding pins 3 are provided on a belt-like device 3a, and these pins are guided along the exit of magazine 45 to push the respective lowest strip out of the magazine and into a turning station or turning device 47.

As shown more clearly in FIGURE 4, the turning station 47 includes as an essential part thereof two slide chutes 1 and 2 which are alternately fed in a manner to be described below. The slide chutes accommodate the wooden strips in transverse position, that is, with the longitudinal axis in the horizontal direction. The strips slide to the exit of the chutes due to the force of gravity and at this point they are picked up and removed by a conveying belt 4. Thus, the wooden strips are fed to the turning device by the feed pins 3 and are removed from the turning device by conveyor 4.

Slide chute 1 is curved and is formed having two sliding surfaces 1' and 1". The upper or entrance portion of this chute is inclined against the transporting direction of conveyor belt 4 whereas its end or discharge section is inclined toward the conveying direction of transport belt 4. The slide chute 2, on the other hand, has but a single slide surface and is inclined at its entrance section as well as at its discharge section in the transporting direction of the transport belt 4.

Figure 6:
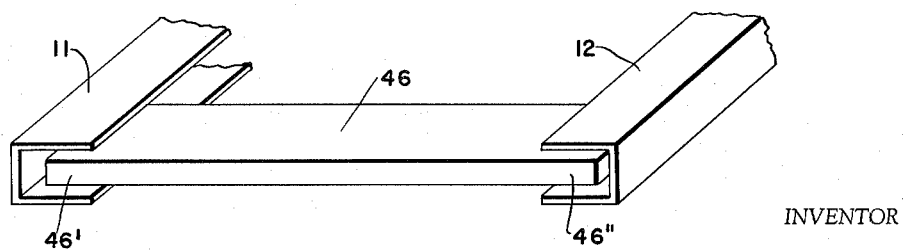
FIGURE 6 is an enlarged fragmentary view illustrating one form of the sliding chute.

One type of slide chute 1 is illustrated in FIGURE 6 wherein the chute is actually formed by two profile irons 11, 12, which are generally U-shaped in cross section and which are spaced from but parallel to each other and disposed at a distance from each other which is at least as long as a length of a wooden strip. The arrangement is such that the profile irons enclose the ends 46', 46" of the strips 46. The chute 2 may be formed by two angle irons. In the arrangement according to FIGURE 6, the surfaces of the chute and the strips which touch each other are diminished, and therefore the friction between the two is diminished.

The feeding pins 3 feed the wooden strips one at a time onto a tipping platform 5 (see FIGURES 4 and 5) and the platform and thus the wooden strips are alternately tipped in one direction and then the other, that is, toward the sliding chute 1 and then toward the sliding chute 2. This will then cause the strips to slide off the tipping platform and onto the chute toward which it is inclined. Considering the tipping platform 5 in a horizontal position, the strips which arrive at the transport belt 4 by means of the sliding chute 1 are turned by 180°, that is, they have the opposite surface facing upwardly from that which had previously faced upwardly, while the strips which arrive at the transport belt by the sliding chute 2 are further transported in their original position.

FIGURE 4 illustrates in phantom lines several positions of a strip on the sliding chute 1 as well as on the sliding chute 2, to indicate the positions that a strip will follow along each chute. Thus, the strip from the sliding chute 1 will arrive at the transport belt 4, then a strip from the sliding chute 2 will arrive, then a strip from the sliding chute 1, etc. In this manner, the desired grouping of the strips in a mirror image like pattern and in pairs will be achieved because the strips had previously been placed together as in their original position in the raw slab. Thus, for example, the grain which appears on the lower surface of one strip and the upper surface of the subsequent strip, is identical, since a cut has been made at this point in order to sever the wood into two strips. Therefore, of necessity, the grain at these two surfaces is identical. By flipping over one of the pieces it may be seen that they will be provided in a mirror image like symmetry with respect to each other.

The platform 5 is arranged above the entrances to the sliding chutes 1 and 2 and is mounted on a pivoting or rotary shaft 5a which extends in the longitudinal direction of the platform. The platform may be pivoted by means of a suitable pivoting device alternately into the rightwardly inclined and then to a leftwardly inclined oblique position. The alternate tipping and restoration of the horizontal position after the respective tipping process may be accomplished, for example, by an eccentric arrangement.

In the embodiment illustrated, the alternate tipping of the platform 5 is provided for or caused by an electromechanical arrangement and the tipping operation is initiated by feeding of the strips onto the tipping platform itself. A illustrated in FIGURE 5, two electromagnets 6 and 7 are disposed horizontally at the front face of tipping platform 5. They are disposed symmetrically on either side of the pivot shaft for electromechanical control. The electromagnets are mounted on projecting wall sections 8 and 9 which are sections of the turning frame 47. The electromagnets 6 and 7 have cores 6′ and 7′, respectively, which are bevelled at the side facing the pivoting shaft. The pivot shaft of the tipping platform 5 is fixedly connected with a common armature 10 of the electromagnets 6 and 7. The longitudinal axis of the armature is disposed at right angles to the tipping platform 5.

Figure 5A:
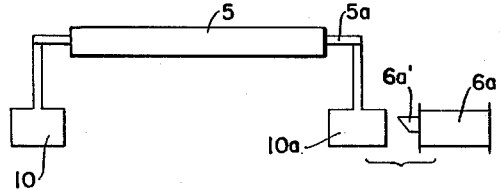
FIGURES 5a and 5b are detail views illustrating the platform moving and coordinating mechanism.

As illustrated in FIGURE 5a, a further electromagnet 6a having a suitably arranged pole 6a′ is provided at the other end of the tipping platform from the end at which electromagnets 6 and 7 are disposed. At the other end of the tipping platform shaft 5a, another armature 10a is provided and this electromagnet can restore the tipping platform into its horizontal position after the tipping process and is, therefore, a return magnet.

Figure 5B:
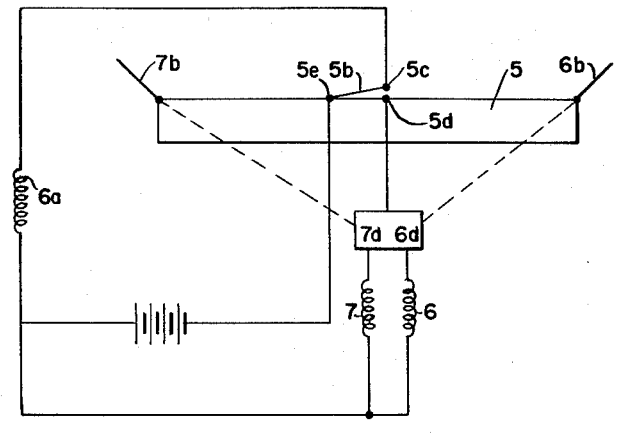

FIGURE 5b shows an electromagnet control circuit which assures that the electromagnets are closed at the proper time. This is provided by means of a switch which includes a contact tongue 5b mounted on the upper surface of the tipping platform 5 and projecting above the surface thereof. If the tipping platform is free and there are no strips thereon, then the contact tongue 5b is in its normal position and engages contact 5c. As shown in the drawing, in this position the coils of the restoring or return magnet 6a are thereby connected by a closed circuit with a battery and thus the coil is energized and the tipping platform is thus held in its horizontal position.

Now, when a wooden strip is placed onto the tipping platform, the contact tongue 5b is depressed and the circuit for electromagnet 6, for example, is closed since contacts 5e and 5d are connected together by means of tongue 5b and thus the coils of electromagnet 6 are connected across the battery. When the electromagnet 6 is energized it causes tipping of the tipping platform. The strip which is disposed on the upper surface of the tipping platform thus slides into the sliding chute 1. The contact tongue 5b which had been pressed downwardly against spring tension which urges it upwardly, rises, and thus the circuit of the restoring magnet is closed and that of electromagnet 6 is opened. While the strip is sliding off the tipping platform 5, it moves a lever member 6b pivoted to the end thereof and mounted at the longitudinal edge of the tipping platform. This member is connected with coordinating element 6d, 7d inserted in series with the coils of electromagnets 6 and 7 so as to always prevent one of the coil circuits of the electromagnets from again closing while permitting the other one to close. This element 6d, 7d is also controlled by a lever member 7b so that first element 6d, 7d closes the circuit to the coil of electromagnet 7 and opens it to the coil of electromagnet 6, and then vice versa. Thus, when terminals 5e and 5d are again bridged by the contact tongue 5b, the coil of electromagnet 7 will be energized since the element 6d, 7d will provide an open circuit at the coil of electromagnet 6. The coil of electromagnet 7 also is provided with this element 6d, 7d which is, in turn, connected with lever 7b in a similar manner as lever 6b is connected thereto as mentioned above.

As will be noted, when electromagnet 7 is energized, the tipping of the tipping platform will occur into the opposite direction and the wooden strip will slide into the sliding chute 2. Upon the next closing of terminals 5e and 5d, the element 6d, 7d is active to prevent energization of the coils of electromagnet 7, whereas the coils of member 6 may be energized. The tipping platform 5 is preferably made of a material which has a low specific weight, and preferably of plastic.

Figure 7:
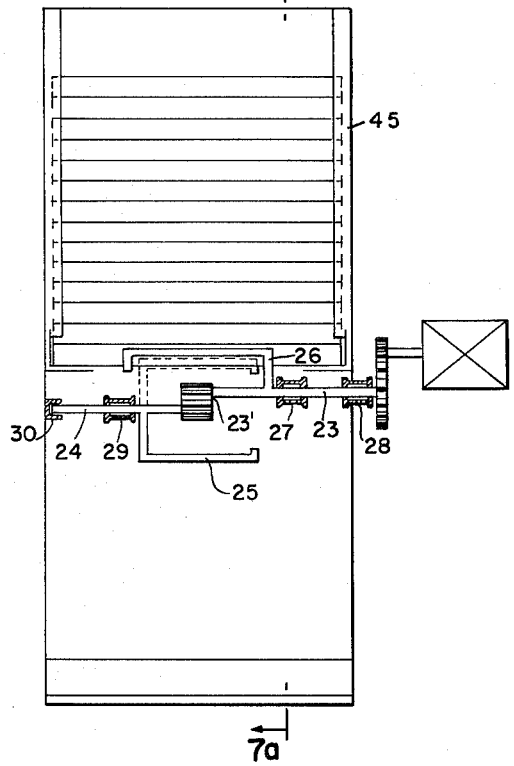
Figure 7A:
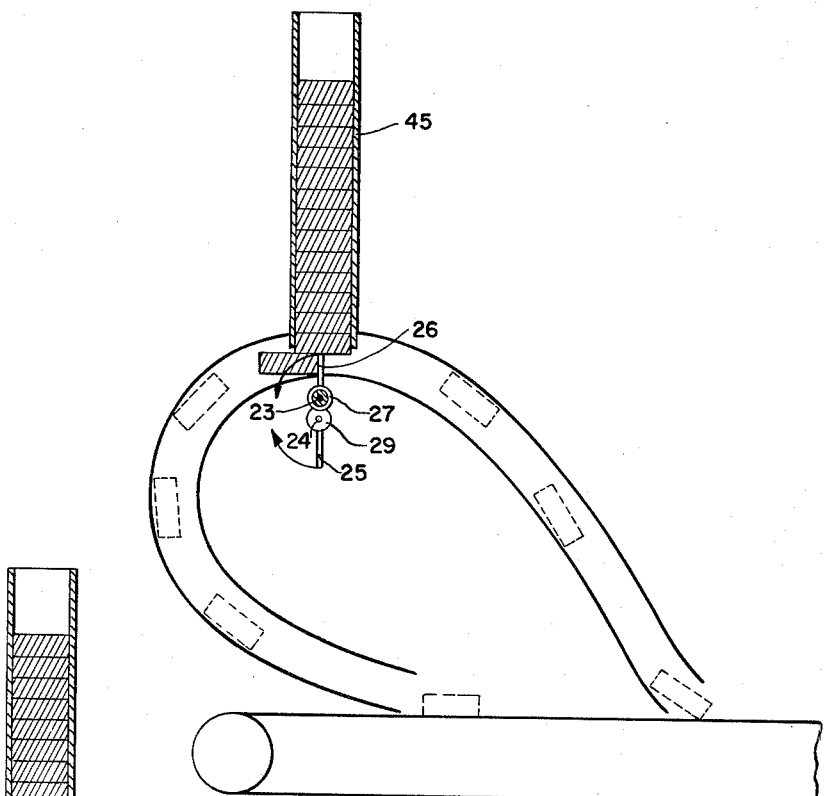
Figure 7B:
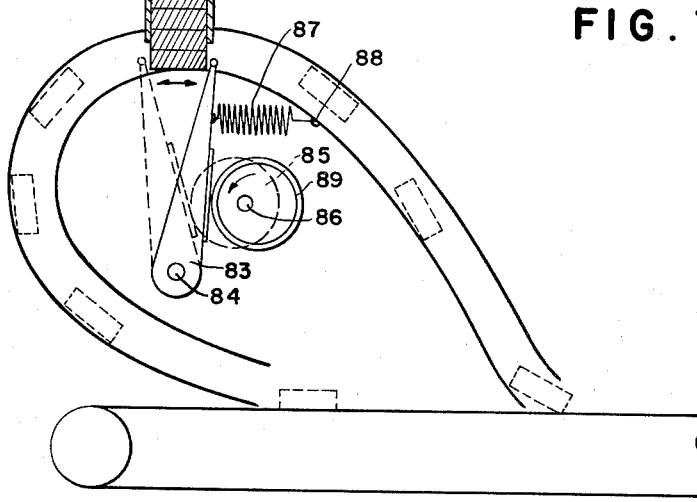

FIGURES 7 and 7a illustrate a preferred embodiment of the turning device. A particularly simple arrangement is provided by mounting the turning elements directly beneath the magazine 45. Rotating shafts 23 and 24 which rotate in opposite directions are disposed centrally beneath the magazine. Each of these shafts is provided with a striking bar 25 and 26, and the moment of rotation of shaft 23 is transmitted via a bevel gear 23′ to the shaft 24 which also has a bevel gear. Shaft 23 is supported at 27 and 28 and shaft 24 is supported at 29 and 30. The bars 25, 26, are arranged so that they may periodically overlap radially and they are initially arranged to have a displacement of 180° with respect to each other as shown in FIGURE 7a. In this manner, the bars 25 and 26 which move in circular paths in different directions take turns in forcing a strip from the lowest position in the magazine and thus the bar 25 will move a strip out towards the right as is viewed in FIGURE 7a, while the bar 26 will move a strip out toward the left, as viewed in this figure. Instead of the oppositely rotating shafts 23 and 24 having striking bars, eccentric controlled cams may also be used which may move back and forth along a circular arc and by means of this movement push out the respective lowest strip in the magazine. As viewed in FIG. 7b the cams 83 are swivel-mounted on the axis 84. An eccentric sheave 85 with a radial ring 89 sliding on a ball bearing of the sheave, drive the cams 83 in the extreme left position (FIG. 7b).

The cams return back to the initial position under the influence of the spring 87, which is mounted on the shaft 88.

It will be understood that the above description of the present invention is susceptible to various modifications, changes, and adaptations, and the same are intended to be comprehended within the meaning and range of equivalents of the appended claims.

What is claimed is:

1. A device for use in making parquet panels wherein pairs of strips in the panels have their grain in mirror-image symmetry, said device comprising, in combination: a turning station; magazine means for holding in a vertical stack and feeding to the turning station in face to face relationship a row of horizontal strips cut from a raw slab and corresponding to their original positions in the raw slab; means included in the turning station and coordinated with the feeding of the strips for moving alternate ones of the strips in opposite directions at right angles to the longitudinal axes of the strips; means forming a pair of slides disposed at opposite sides of the turning station for receiving strips moved into them by said moving means and guiding the strips along downwardly extending paths, one of said slide means reversing in the vertical plane to discharge strips therefrom with that surface facing upwardly which was facing downwardly in the magazine means, the other of said slide means being disposed to discharge strips substantially parallel to those discharged from said one slide means and having the same surface up as was up in the magazine means; and means defining a transport direction substantially at right angles to the orientation of the discharged strips for transporting strips away from such turning station at such speed that they are arranged in side by side relationship and in mirror-image symmetry.

2. A device as defined in claim 1 wherein said magazine means is vertically arranged and wherein the moving element includes a striking element disposed centrally beneath the magazine means and moving in opposite directions in circular paths, said slides including two sliding chutes, one connected at each side of said magazine means, one of said sliding chutes being inclined in its entrance section as well as in its discharge section downwardly in the transport direction of the transport means, the other of said sliding chutes being downwardly inclined in its entrance section against the transport direction and inclining downwardly in its discharge section toward the transport direction of the transport means.

3. A device as defined in claim 2 wherein there are two striking elements which include two striking bars mounted on two shafts rotating in opposite directions, said striking bars being arranged to alternately contact the strips.

4. A device as defined in claim 2 wherein said striking element is a striking cam which moves to and fro and is controlled by an eccentric.

5. A device as defined in claim 1 wherein said moving means is a tipping platform arranged to be alternately tipped toward the entrances of the slides.

6. A device as defined in claim 5 wherein said platform is controlled by eccentrics.

7. A device as defined in claim 5 wherein the tipping movement of the tipping platform is controlled by an electromagnet arrangement.

8. A device as defined in claim 1 wherein said slides are formed of two profile irons having U-shaped cross sections which are disposed parallel to each other and spaced from each other by a distance which is at least equal to the length of the strips.

9. A device for use in making parquet panels wherein pairs of strips in the panels are in mirror-image symmetry, said device comprising, in combination: a turning station; magazine means for holding in a vertical stack and for feeding to the turning station a row of horizontal strips cut from a raw slab and in face to face relationship and corresponding to their original positions in the raw slab; slide elements for guiding strips from the turning station and having inlets of opposite lateral entering directions, said slide elements extending downwardly and one of them reversing vertically so as to discharge strips therefrom with the side facing upwardly which was facing downwardly in the magazine means, the other slide element extending downwardly to discharge strips therefrom substantially parallel to the strips discharged from the first-mentioned slide element and having the same side up as was up in said magazine means; a turning element in said turning station controlled in synchronism with the feeding of said strips for moving the strips transversely to their longitudinal axes and alternately moving them into the inlets of the slide elements; and means for transporting strips discharged from said slide elements away from such turning station at a speed sufficient to ensure that each consecutive pair of strips is arranged on the transport means in side by side relationship and in mirror-image symmetry.

10. A turning device for use in making parquet panels from strips cut from a raw slab and having groups of wood strips in mirror-image symmetry with respect to the grain, said device comprising, in combination: magazine means for holding in a vertical stack and feeding horizontal strips in a row in face to face relationship and in contact corresponding to their original positions in the raw slab; turning elements disposed at the end of said feeding means and coordinated with the movement of the strips thereon for imparting motion in opposite directions at right angles to their longitudinal axes to alternate ones of the strips fed from said magazine means; means disposed lower than the magazine means for transporting away such strips; and guiding elements in the form of slides having inlets with opposite entering directions for receiving alternate ones of the strips moved by said turning elements, one of said slides extending downwardly and reversing vertically to discharge strips therefrom so that they lie across said transport means with the surface facing upwardly that was facing downwardly in the magazine means, the other of said slides extending downwardly to discharge strips therefrom so that they lie across the transport means with the same surface up as was up in the magazine means; said transport means moving at a speed such that the strips are arranged thereon sequentially and in mirror-image symmetry.

11. A device for the manufacture of small parquet panels composed of wood strips, comprising strip units of differing axial directions within which strips are put together such that two neighboring strips provide a bilaterally symmetrical grain pattern, the axis of symmetry being the seam between the two strips, said device comprising, in combination: a magazine having an outlet and containing a vertical stack of strips which are positioned horizontally such that their broad sides touch corresponding to their original position in the raw plank; means forming a conveying path; two slides disposed on opposite sides of said outlet and having strip inlets of opposite lateral entering directions, for imparting to the strips a sliding motion which is at right angles to the strip axis, one of said slides reversing downwardly in the vertical plane to invert a strip sliding therethrough about its axis, the other of said slides extending downwardly to discharge strips sliding through it with the same side facing upward as was upward in said magazine, the strip outlets of these two slides ending above the conveyor path and having the same lateral exit direction so as to discharge strips substantially across said conveying path; and feeding elements provided in the strip inlets for feeding the strips removed from the magazine alternately into opposite ones of the strip inlets; said conveying path means moving at such rate that corresponding strips discharged from said two slides are arranged in mirror-image symmetry, and sequential pairs of corresponding strips are disposed sequentially along said path.

(References on following page)

References Cited by the Examiner

UNITED STATES PATENTS

| | | | |
|---|---|---|---|
| 623,562 | 4/99 | Rider | 20—8 |
| 1,859,633 | 5/32 | Rhinevault | 144—2.1 |
| 2,113,076 | 4/38 | Bruce | 20—8 |
| 2,668,483 | 2/54 | Sykes | 93—93.3 |
| 2,650,627 | 9/63 | Tibbals | 144—2.1 |

FOREIGN PATENTS

| | | |
|---|---|---|
| 1,217,293 | 12/59 | France. |
| 853,966 | 10/52 | Germany. |

ROBERT C. RIORDON, *Primary Examiner.*

WILLIAM W. DYER, Jr., LESTER M. SWINGLE,
*Examiners.*